(12) United States Patent
Kubota et al.

(10) Patent No.: US 7,267,151 B2
(45) Date of Patent: Sep. 11, 2007

(54) LAMINATING APPARATUS

(75) Inventors: Suinobu Kubota, Nagano (JP); Satoru Tokida, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 379 days.

(21) Appl. No.: 10/921,131

(22) Filed: Aug. 19, 2004

(65) Prior Publication Data

US 2005/0039856 A1 Feb. 24, 2005

(30) Foreign Application Priority Data

Aug. 20, 2003 (JP) ............................. 2003-296590

(51) Int. Cl.
*B29C 65/00* (2006.01)
(52) U.S. Cl. ...................... 156/381; 156/358; 156/382; 156/498
(58) Field of Classification Search ................ 156/381, 156/382, 498, 580, 358; 198/576; 414/147
See application file for complete search history.

(56) References Cited

U.S. PATENT DOCUMENTS 5,472,556 A * 12/1995 Sanko ......................... 156/498

2001/0005603 A1 * 6/2001 Kubota ........................ 438/126

FOREIGN PATENT DOCUMENTS

JP 3381027 B2 12/2002
JP 3381027 B2 * 2/2003

OTHER PUBLICATIONS

Machine Translation of JP3381027B2.*

* cited by examiner

*Primary Examiner*—Jeff H. Aftergut
*Assistant Examiner*—Daniel McNally
(74) *Attorney, Agent, or Firm*—Birch, Stewart, Kolasch & Birch, LLP

(57) ABSTRACT

When a laminating apparatus M is constituted with a vacuum suction step S1 for vacuum sucking an enclosed space in a work tray 2 accommodating a laminated-substrate W, a thermocompression-bonding step S2 for heating and pressuring the work tray 2 having finished the vacuum suction step S1, and a cooling step S3 for cooling the work tray 2 having finished the thermocompression-bonding step S2, a conveyer route R of a rectangular frame form to circulatorily convey the work tray 2 along a horizontal direction is provided, and in a processing conveyer section Rp composing one side of the conveyer route R, the vacuum suction step S1, the theremocompression-bonding step S2, and the cooling step S3 are sequentially disposed.

21 Claims, 11 Drawing Sheets

LAMINATING APPARATUS

This Nonprovisional application claims priority under 35 U.S.C. § 119(a) on Patent Application No(s). 2003-296590 filed in Japan on Aug. 20, 2003, the entire contents of which are hereby incorporated by reference.

BACKGROUND OF THE INVENTION

1. Field of the Invention

The present invention relates to a laminating apparatus for manufacturing an IC card and the like by having a vacuum suction step, a thermocompression-bonding step, and a cooling step.

2. Description of the Relevant Art

Conventionally, as a laminating apparatus for manufacturing a thin IC card containing an electronic component such as an IC chip, an IC card manufacturing apparatus disclosed in Japanese Patent Publication No. 3381027 is known.

This IC card manufacturing apparatus manufactures an IC card by thermocompression bonding a laminated-substrate which consists of an electronic component such as an IC chip held between sheet materials. The IC card manufacturing apparatus includes: a laminated-substrate sandwiching unit composed of an upper sandwiching member and a lower sandwiching member for sandwiching the laminated-substrate in a sealed state, an evacuation unit for evacuating an interior of the laminated-substrate sandwiching unit, a pre-heating press unit for elevating a temperature of the evacuated laminated-substrate sandwiching unit which holds the laminated-substrate with a pre-heating temperature lower than a regular heating temperature, a thermocompression-bonding press unit for thermocompression bonding the evacuated laminated-substrate sandwiching unit which holds the laminated-substrate and transferred from the pre-heating press unit, and a cooling unit to cool the evacuated laminated-substrate sandwiching unit which holds the laminated-substrate and transferred from the thermocompression-bonding press unit. According thereto, since heating press control and pressuring control to the laminated-substrate is conducted independently by the separate pre-heating press unit, thermocompression-bonding press unit, and the cooling press unit, a production cycle time is shorten, improving productivity and mass-production efficiency, and enhancing energy conservation and economical efficiency. Additionally, since the laminated-substrate is accommodated within the sealed and evacuated laminated-substrate, a heating state and a pressuring state are continuously secured; i.e.; a temperature and a pressure of the laminated-substrate is secured, and therefore quality and homogeneity are improved to increase merchantability.

However, since this IC card manufacturing apparatus (laminating apparatus) uses a rotary conveyer method in which the respective press units rotate centering on a driving shaft portion, in spite of merits of the rotary conveyer method, this apparatus has disadvantages described below.

First, since the respective press units are disposed around the driving shaft portion, when another processing step (pressing unit and the like) is added, design modification of the entire apparatus is required, and besides a number of steps to be able to be added is limited. Therefore this apparatus is disadvantageous in terms of expansibility.

Secondly, since a size of the laminated-substrate cannot be easily enlarged, this apparatus is disadvantageous in terms of freedom of design, and an improvement in mass-productivity is difficult to achieve considering an aspect of the laminated-substrate size.

Thirdly, since the respective press units rotate centering on the driving shaft portion, when for example an optional processing step is monitored, the other processing steps cannot be easily monitored. Therefore, monitoring of the entire steps cannot be conducted easily or efficiently. Also, a moving distance (work flow) of an operator for monitoring, maintenance or the like becomes long.

SUMMARY OF THE INVENTION

An object of the present invention is to provide a laminating apparatus with high expandability in which an alteration in respective processing steps or an addition of another processing step can be easily responded by a design alteration as minor as an alteration in a length of a conveyer route, so that an optional number of additions becomes possible.

Another object of the present invention is to provide a laminating apparatus in which freedom of design is obtainable in that for example a size of a laminated-substrate, specifically a size in a conveying direction, can be optionally set, and which can contribute to an improvement in mass-production.

Additionally, still another object of the present invention is to provide a laminating apparatus in which monitoring of the entire steps can be conducted easily and efficiently in that for example the entire processing steps can be monitored at a fixed position, and in which a moving distance (work flow) of an operator for monitoring, maintenance or the like can be shorten.

In order to achieve these objects, the present invention is characterized by that when a laminating apparatus is constituted with a vacuum suction step for vacuum sucking an enclosed space in a work tray accommodating a laminated-substrate, a thermocompression-bonding step for heating and pressuring the work tray having finished the vacuum suction step, and a cooling step for cooling the work tray having finished the thermocompression-bonding step, a conveyer route of a rectangular frame form which circulatorily conveys the work tray along a horizontal direction is provided, and in a processing conveyer section composing one side of this conveyer route the vacuum suction step, the thermocompression-bonding step, and the cooling step are sequentially disposed.

DETAILED DESCRIPTION OF THE PREFERRED EMBODIMENT

Next, a preferable embodiment related to the present invention will be cited and described in detail with reference to the drawings. It should be noted that the attached drawings are not for specifying the present invention but to facilitate understanding of the present invention. As for well-known portions, in order to avoid making the present invention obscure, detailed explanation will be restrained.

Here, a structure of a laminating apparatus M according to the present embodiment will be described with reference to FIG. 1 to FIG. 14.

First, a work tray 2 and a laminated-substrate W which are used in the laminating apparatus M will be described with reference to FIG. 2 to FIG. 4.

Figure 4:
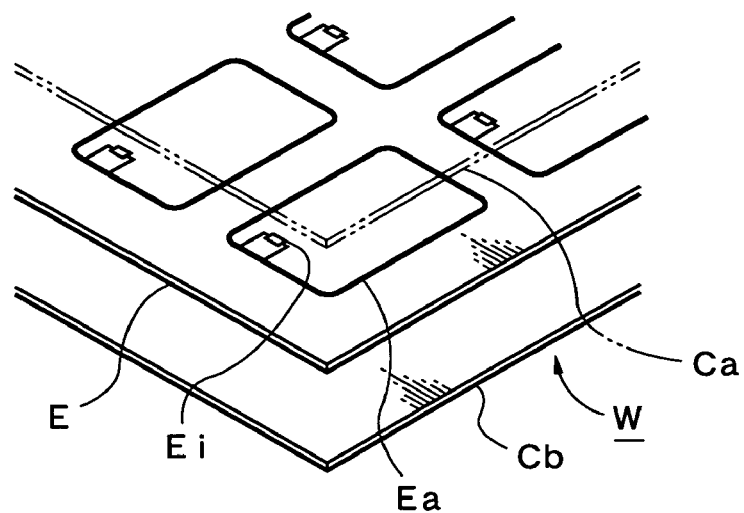
FIG. 4 is a partial perspective view of a laminated-substrate which the laminating apparatus laminates.

FIG. 4 shows an exploded view of the laminated-substrate W for manufacturing IC cards. In FIG. 4, "E" is a component sheet, on which plural electronic components each having IC chips Ei and antennas Ea are mounted in a state of being arranged vertically and horizontally. The component sheet E is held between a pair of upper and lower sheet materials Ca and Cb. Respective sheet materials Ca and Cb have, for example, an outer resin sheet (polyethylene terephthalate or others) and an inner non woven fabric, and on an interior surface of each Ca and Cb, adhesive is coated. Such a laminated-substrate W is manufactured in another process, and the laminated component sheet E, sheet materials Ca and Cb are temporarily fixed at plural positions by welding and the like.

Figure 2:
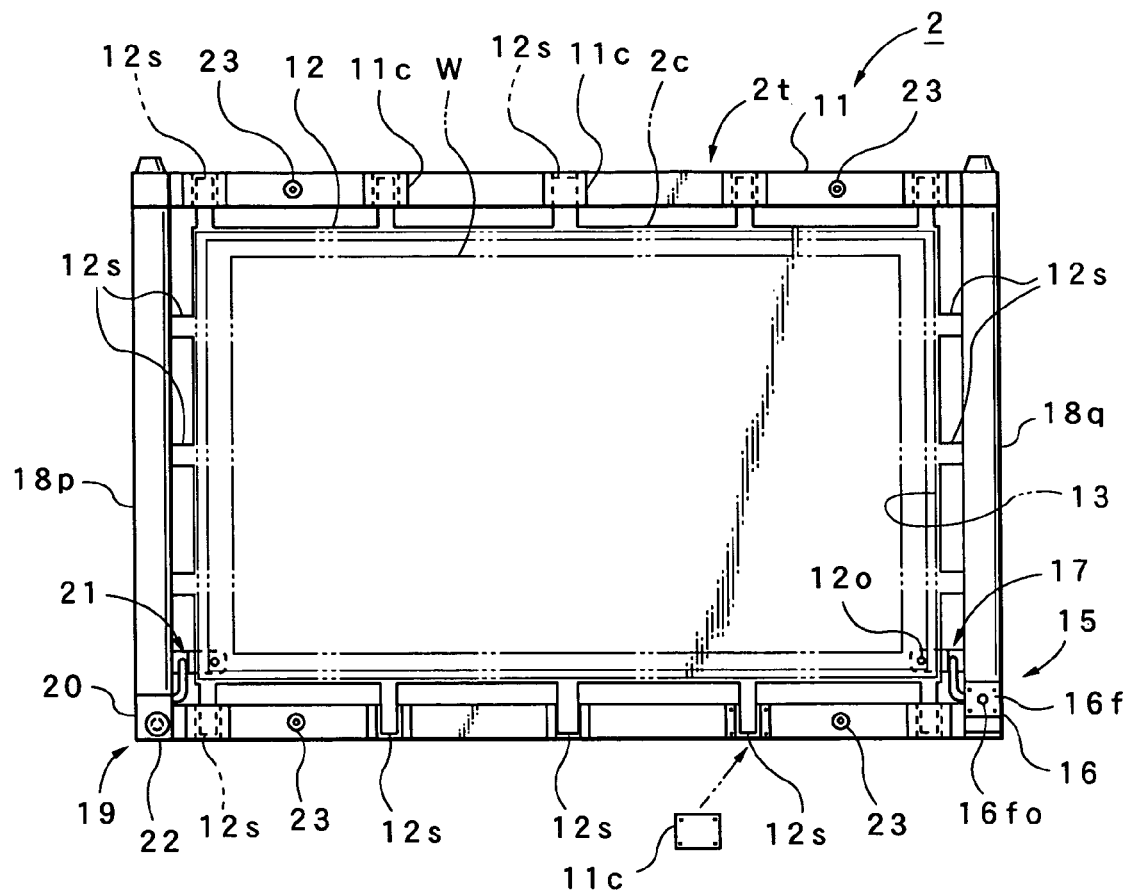
FIG. 2 is a plan view of a work tray (tray portion) of the laminating apparatus.
Figure 3:
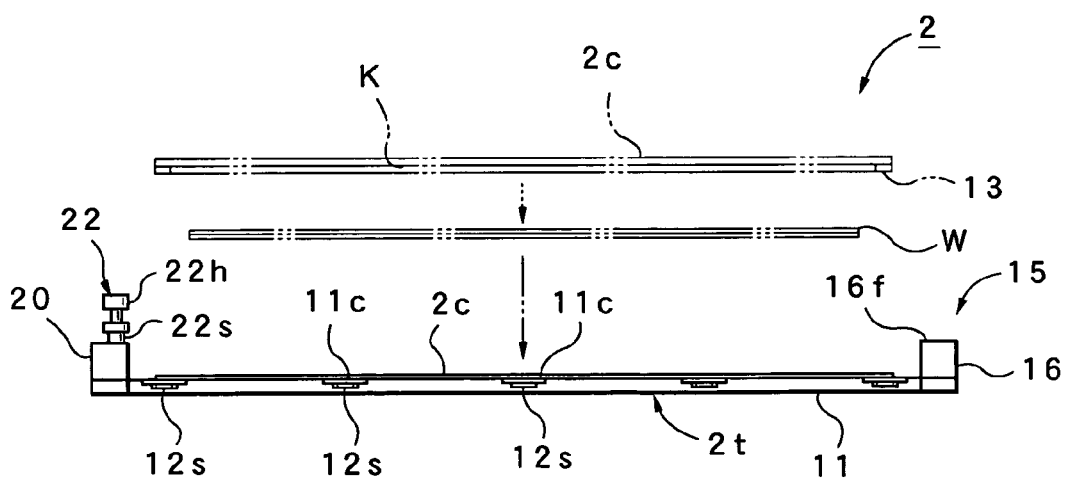
FIG. 3 is a rear view of the work tray of the laminating apparatus.

Meanwhile, FIG. 2 and FIG. 3 show a work tray 2 to accommodate this laminated-substrate W. The work tray 2 includes a tray portion 2t at the lower side and to overlap a top surface of this tray portion 2t a cover portion 2c at the upper side. The tray portion 2t includes a supporting frame portion 11 of aluminum material and the like which is structured into a frame shape, and a rectangular shaped tray main body 12 formed of a flat board. The tray main body 12 has a plurality of engaging pieces 12s . . . , which engage to the supporting frame portion 11. In this case, by providing a plurality of engaging recesses at predetermined positions on a top surface of the supporting frame portion 11, then housing respective engaging pieces 12s . . . , and covering the respective engaging recesses with cover plates 11c . . . , the respective engaging pieces 12s . . . can be engaged to the supporting frame portion 11. According thereto, the tray main body 12 is supported inside of the frame supporting portion 11. Additionally, the cover portion 2c is formed of a flat board so as to be a rectangular shape almost same size as the tray main body 12, and on an undersurface and along four sides thereof, a seal portion 13 of a rectangular frame form with a predetermined thickness is fixed. Incidentally, the tray portion 2t and the cover portion 2c can be formed of stainless steel material and the like, of which a suitable thickness is 3 mm or less, preferably about 1 mm. Consequently, when the laminated-substrate W is placed on the top surface of the tray main body 12 and overlapped by the cover portion 2c, an enclosed space K accommodating the laminated-substrate W is formed between the tray main body 12 and the cover portion 2c.

Meanwhile, at a right corner, in a conveying direction, of the supporting frame 11, a vacuum connecting portion 15 is provided. This vacuum connecting portion 15 includes a connecting body portion 16 which has a surface 16f to be sucked, and a connection path portion 17 which connects this connecting body portion 16 and a suction opening 12o formed on the tray main body 12. A vacuum connection inlet 16fo which opens on the surface 16f to be sucked and the suction opening 12o which opens on an undersurface side of the tray main body 12 are connected through a ventilation path. In this case, the connecting body portion 16 contains a check valve connected to the ventilation path and includes a release operation portion to release a function of the check valve. Additionally, on a right and left frame members of the supporting frame 11, cylindrical vacuum tank 18p and 18q are mounted. The tank 18q is directly connected to the ventilation path inside the connecting body portion 16, while the other vacuum tank 118p is connected to the enclosed space K in the work tray 2 via a vacuum connecting portion 19 provided at a left corner of the supporting frame portion 11. Though this vacuum connecting portion 19 has a connecting body portion 20 and a connection path portion 21 similar to those of the vacuum connecting portion 15, without the surface 16f to be sucked and the like, this only connects the enclosed space K and the vacuum tank 18p.

Moreover, on a top surface of the connecting body portion 20, an element 22 to be detected is mounted. This element 22 to be detected includes a shaft portion 22s inserted into the connecting body portion 20, and a head portion 22h attached at a superior end of the shaft portion 22s, which is to be detected by a detecting portion 73 described later. This element can be selectively displaced, being pulled upward against the connecting body portion 20 to a detection position Xd (see FIG. 10), or being pushed downward to a non detection position Xn (see FIG. 11). Consequently, when the element 22 to be detected is at the detection position Xd, it is detected by the detecting portion 73, and when being at the non detection position Xn, it is not detected by the detecting portion 73. Additionally, on front and back frame members of the supporting frame 11, two pairs, four total, of positioning openings 23 . . . are formed.

Next, a structure of a main body of the laminating apparatus M will be described with reference to FIG. 1 and FIG. 5 to FIG. 14.

Figure 1:
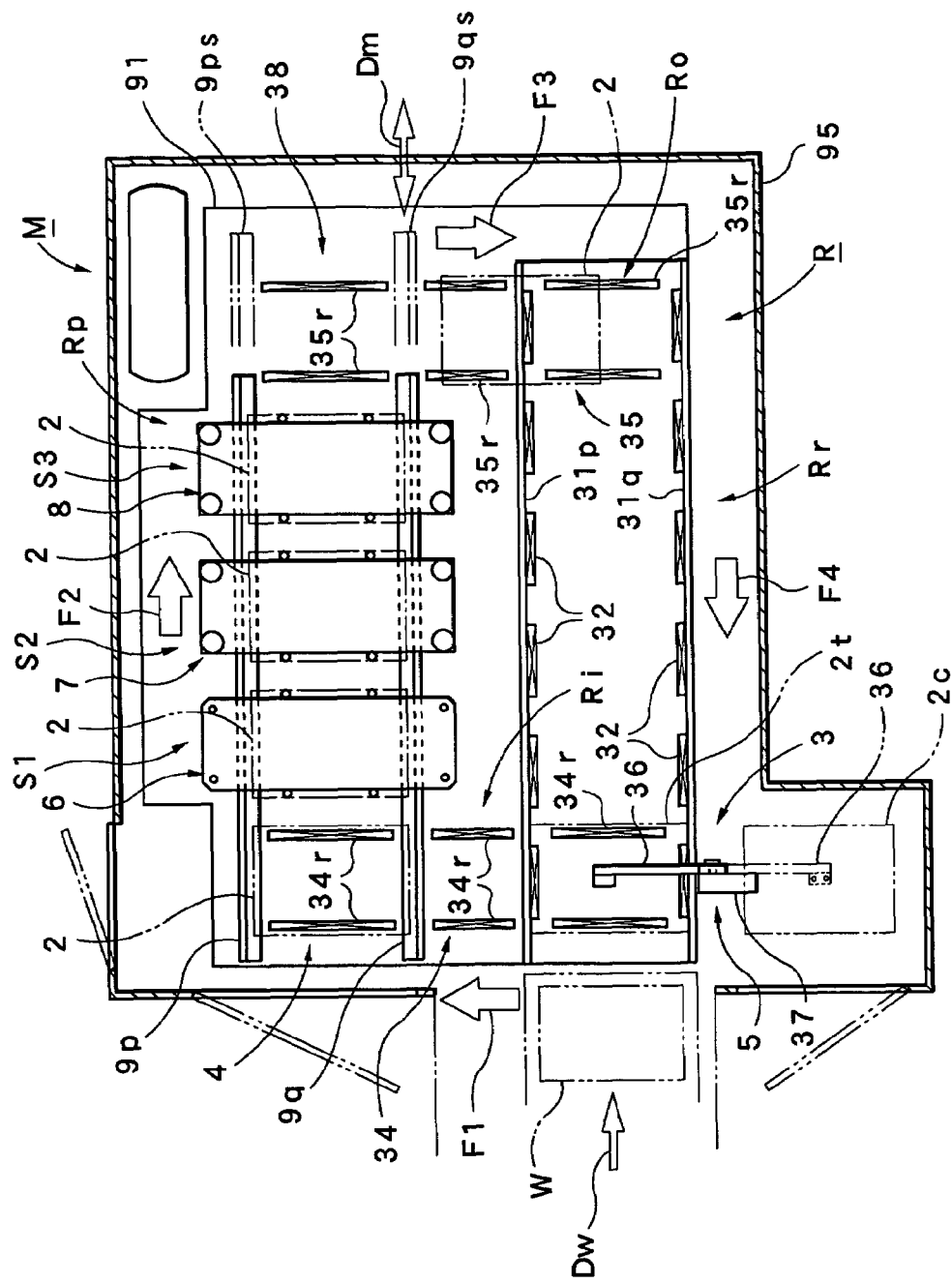
FIG. 1 is a plan view showing an overall structure of a laminating apparatus according to a preferable embodiment of the present invention.

FIG. 1 shows an overall structure of the laminating apparatus M. The laminating apparatus M has, as shown in FIG. 1, a conveyer route R which is a rectangular frame form as a whole in plain view. This conveyer route R includes a processing conveyer section Rp and a returning conveyer section Rr which are disposed parallel to each other on a horizontal surface, and also includes an introducing conveyer section Ri disposed between one ends of the processing conveyer section Rp and the returning conveyer section Rr, and a discharging conveyer section Ro disposed between the other ends of the processing conveyer section Rp and the returning conveyer section Rr. According thereto, the conveyer route R is formed to be a rectangular frame as a whole.

The returning conveyer section Rr includes, in a conveying direction, a pair of right and left guide rails 31p and 31q, and a plurality of conveyer roller mechanisms 32 . . . which is disposed inside the guide rails 31p and 31q. The processing conveyer section Rp includes, in a conveying direction, a pair of right and left conveyer carriers 9p and 9q, and driving portions 33 . . . can selectively move these conveyer carriers 9p and 9q to two positions of forward or backward in a conveying direction (in the direction of an arrow Dm). In FIG. 1, the conveyer carriers 9p and 9q shown by solid lines are in the backward position, while the conveyer carriers 9ps and 9qs shown by virtual lines are in the forward position. On these conveyer carriers 9p and 9q right and left ends of the work tray 2 can be placed.

Meanwhile, the introducing conveyer section Ri includes, disposed between the respective guide rails 31p and 31q, between the respective conveyer carriers 9p and 9q, and between the guide rail 31p and the conveyer carrier 9q, a conveyer mechanism 34 with plurality of conveyer roller mechanisms 34r . . . , and this conveyer mechanism 34 can be selectively raised or lowered to two positions in a vertical direction. Additionally, the discharging conveyer section Ro includes, disposed between the respective guide rails 31p and 31q, the respective conveyer carriers 9p and 9q₁ and between the guide rail 31p and the conveyer carrier 9q, a conveyer mechanism 35 with a plurality of conveyer roller mechanisms 35r . . . , and this conveyer mechanism 35 can be selectively raised or lowered to two positions in a vertical direction.

In one corner of the conveyer route R from which the introducing conveyer section Ri starts, a loading section 3 to load the laminated-substrate W on the work tray 2 is provided. The loading section 3 includes a cover attaching/detaching section 5 to attach and detach the upper cover portion 2c of the work tray 2 to/from the lower tray portion 2t. This cover attaching/detaching section 5 has an attaching/detaching arm 36 with a suction portion at a front end thereof, and a pivotally driving portion 37 to pivot a back end of this attaching/detaching arm 36 to a predetermined degree. Additionally, in the next corner of the conveyer route R from which the processing conveyer section Rp starts, a standby section 4 for the work tray 2 is provided, and on the next corner of the conveyer route R from which the discharging conveyer section Ro starts, a discharging section 38 for the work tray 2 is provided. Moreover, between the standby section 4 and the discharging section 38, a vacuum suction step S1, a thermocompression-bonding step S2, and a cooling step S3 are sequentially provided. These vacuum suction step S1, thermocompression-bonding step S2, and cooling step S3 include a vacuum press unit 6, heating press unit 7, and cooling press unit 8, respectively.

Next, structures of the respective press units 6 to 8 will be described precisely. FIG. 5 to FIG. 11 show a structure of the heating press unit 7. This heating press unit includes, as shown in FIG. 6 and FIG. 7, an upper supporting board 41 and a lower supporting board 42, which are positioned apart from each other vertically and coupled by coupling shafts 43. On an undersurface of the upper supporting board 41, an upper pressure board (upper heat board) 7u containing a heater is fixed. The undersurface of the upper pressure board 7u is a flat surface, on which a filler sheet 44u is bonded. Beneath and facing this upper pressure board 7u, a lower pressure board (lower heat board) 7d is provided. This lower pressure board 7d is supported raisable and lowerable by a pressure mechanism 50. This lower pressure board 7d, as the upper pressure board 7u, contains a heater and has a flat top surface on which a filler sheet 44d is bonded.

Figure 5:
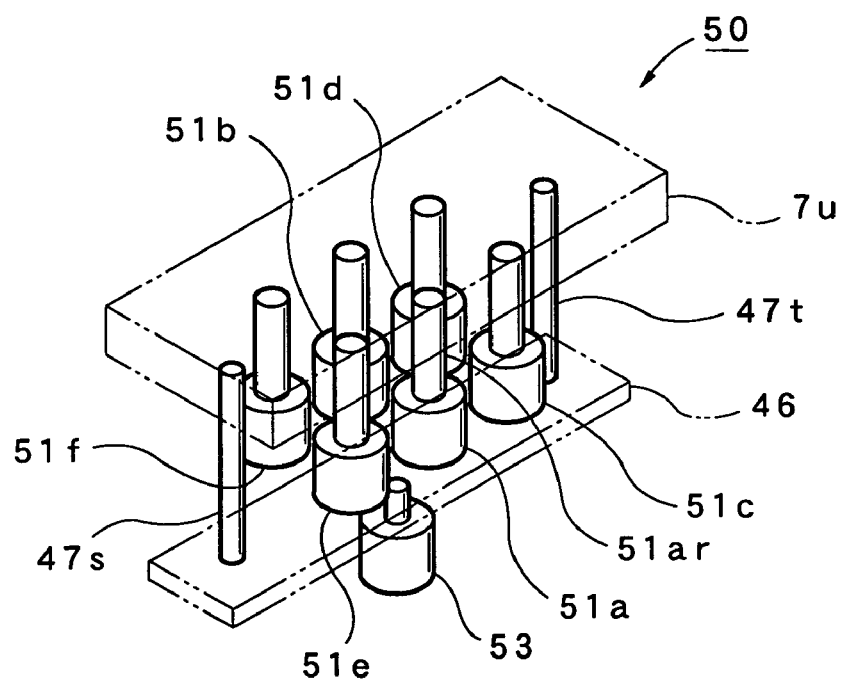
FIG. 5 is a perspective view showing positional relationship of secondary pressure cylinders in a pressure mechanism provided in a heating press unit of the laminating apparatus.
Figure 6:
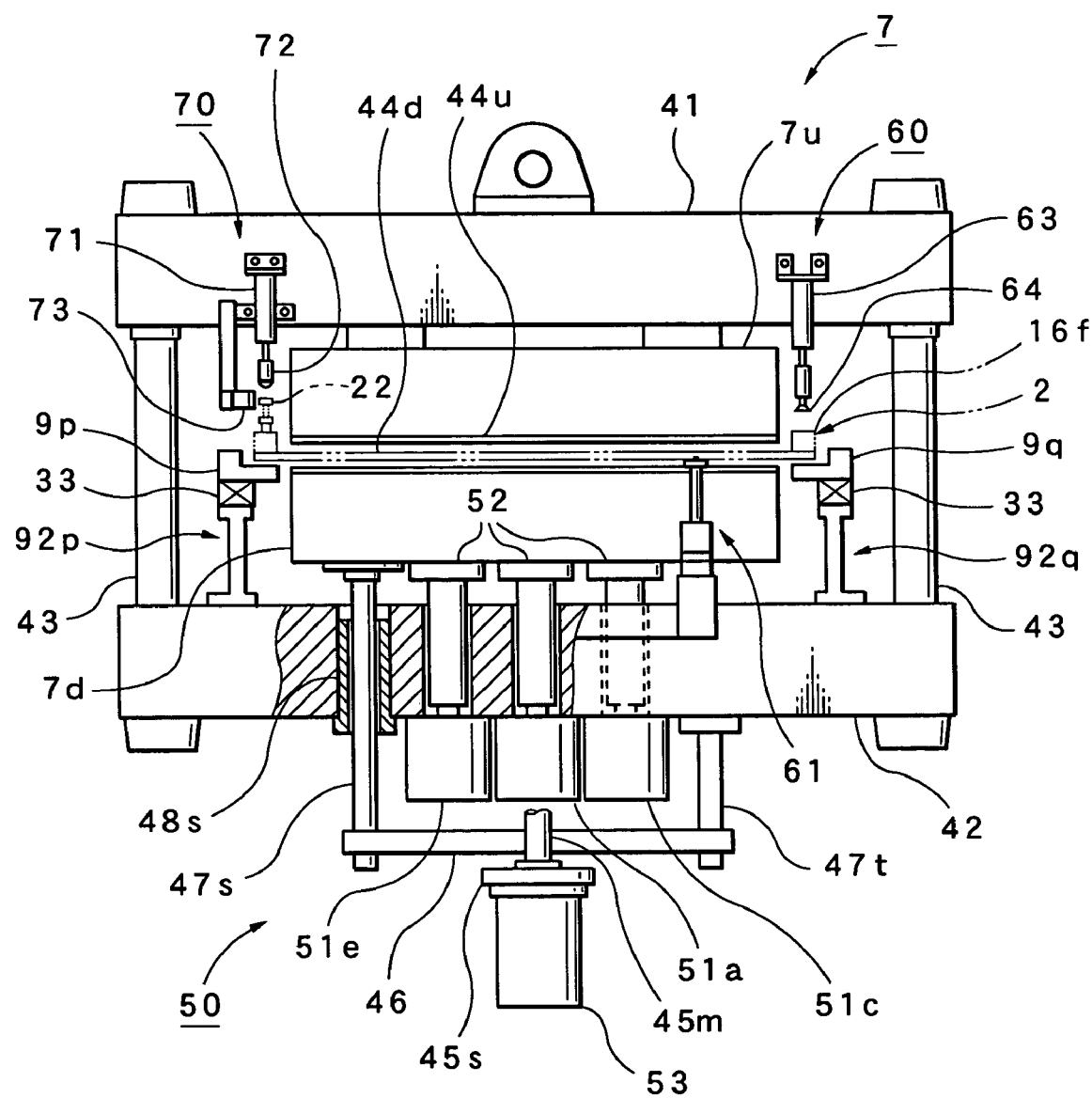
FIG. 6 is a partial sectional rear view of the heating press unit.
Figure 7:
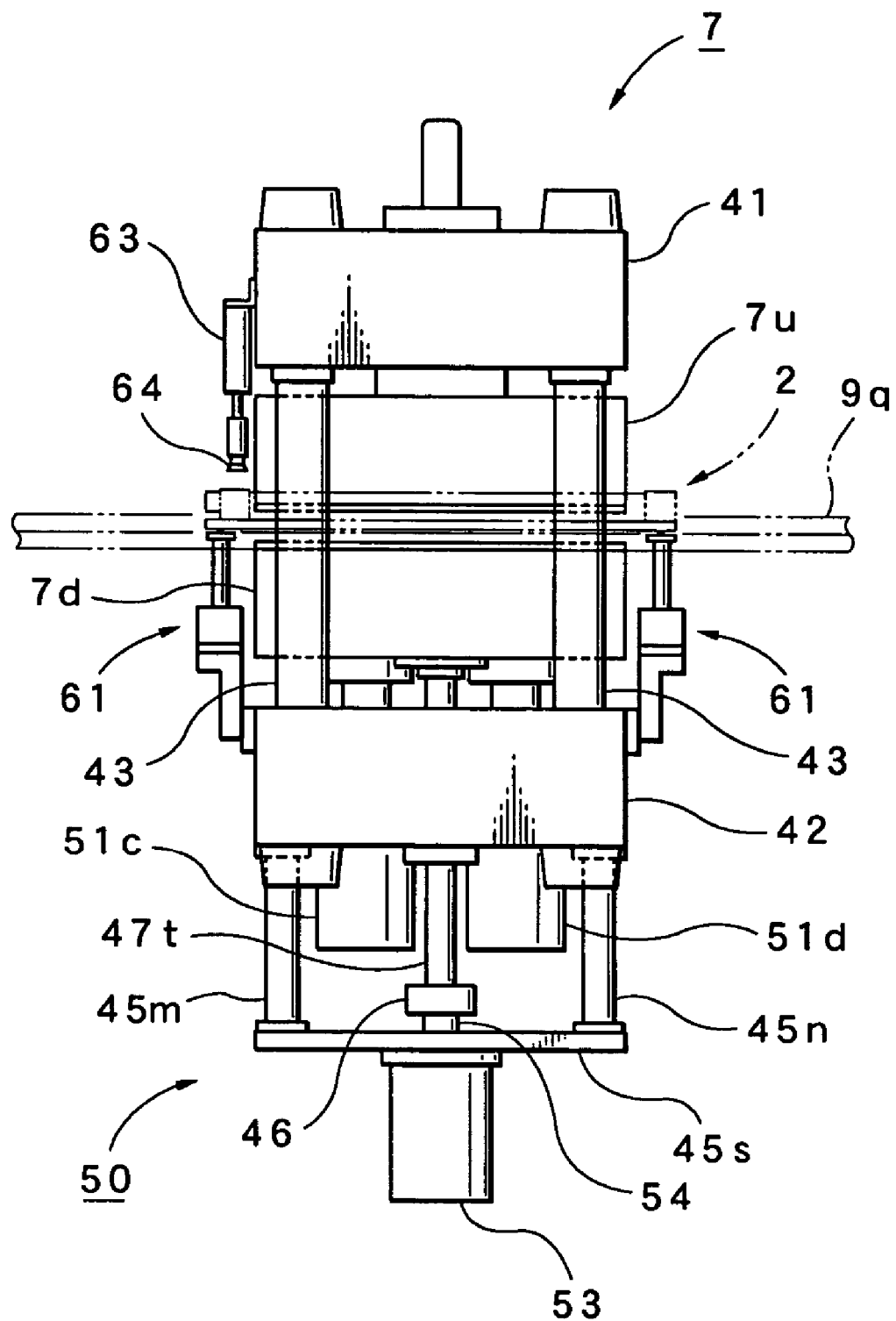
FIG. 7 is a side view of the heating press unit.
Figure 8:
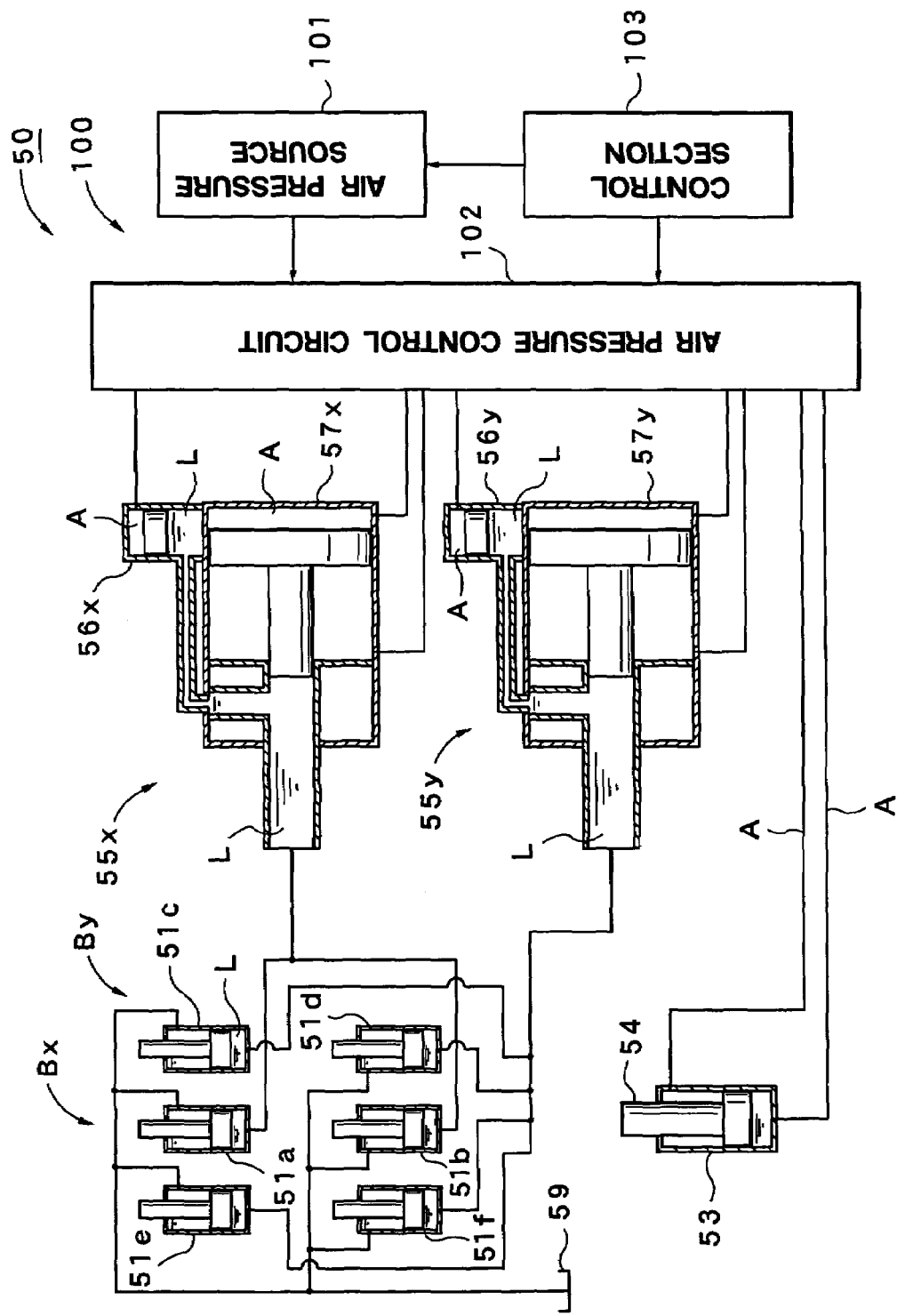
FIG. 8 is a circuit structure diagram of the pressure mechanism provided in the heating press unit.

The pressure mechanism 50 includes, as shown in FIG. 5 and FIG. 6, six secondary pressure cylinders 51a, 51b, 51c, 51d, 51e, and 51f fixed on the undersurface of the lower supporting board. The respective secondary pressure cylinders 51la . . . are arranged in two symmetric rows of three cylinders. Cylinder rods 51ar . . . of respective secondary pressure cylinders 1a . . . penetrate through the lower supporting board 42 and protrude upward from a top surface, and end faces thereof abut on corresponding abutting plates 52 . . . which are fixed on an undersurface of the lower pressure board. By abutting respective cylinder rods 51ar . . . on the abutting plates 52 . . . , horizontal displacement of the lower pressure board 7d caused by thermal expansion can be absorbed. In this case, for the respective secondary pressure cylinders 51a . . . , single rod type hydraulic cylinders are used as shown in FIG. 8. Accordingly, the lower pressure board 7d is pressured by the secondary pressure cylinders 51a . . . .

Additionally, as shown in FIG. 7, on an undersurface of the lower supporting board 42, via a pair of supporting rods 45m and 45n a supporting plate 45s is mounted, and this supporting plate 45s supports an auxiliary cylinder 53. For this auxiliary cylinder 53, an air cylinder is used. An end of a piston rod 54 of the auxiliary cylinder 53 couples a movable plate 46, and this movable plate 46 and the undersurface of the lower pressure board 7d are coupled with each other by a pair of link rods 47s and 47t which penetrate through the lower supporting board 42. Incidentally, 48s . . . are bushes fit on outer peripheral faces of 47s . . . , which provide predetermined clearances between the link rods 47s . . . and the lower supporting board 42, so that horizontal displacement of the lower pressure board 7d (link rods 47s . . . ) caused by thermal expansion is absorbed.

Meanwhile, as shown in FIG. 8, two primary pressure cylinders 55x and 55y are provided separately. One of the primary pressure cylinders 55x is structured switchable between a low pressure output and a high pressure output, and includes a first cylinder portion 56x for a low pressure output with a back room capable of supplying air A and a front room capable of accommodating oil L, as well as a second cylinder portion 57x for a high pressure output with a back room capable of supplying air A and a piston rod room capable of accommodating oil L. The front room of the first cylinder portion 56x and the piston rod room of the second cylinder portion 57x are made confluent. The second cylinder portion 57x is structured of a pressure intensifying cylinder, with a pressure intensifying ratio thereof being set to be larger than the pressure intensifying ratio of the first cylinder portion 56x. In the embodiment, the pressure intensifying ratio of the first cylinder portion 56x is 1:1, while the pressure intensifying ratio of the second cylinder portion 57x is set at 1:25. The other primary pressure cylinder 55y is structured same as the primary pressure cylinder 55x. In the primary pressure cylinder 55y, "56y" indicates a first cylinder portion, and "57y" indicates a second cylinder portion.

Meanwhile, respective secondary pressure cylinders 51a, 51b, 51c, 51d . . . are divided into plural cylinder groups Bx and By. In the embodiment, two secondary pressure cylinders 51a and 51b positioned at a center are included in a cylinder group Bx, while four secondary pressure cylinders 51c, 51d, 51e, and 51f positioned at both sides of these secondary pressure cylinders 51a and 51b are included in a cylinder group By. The piston rod room of the second cylinder portion 57 in the primary pressure cylinder 55x is connected to back rooms of the secondary pressure cylinders 51a and 51b in the cylinder group Bx, while the piston rod room of the second cylinder portion 57y in the primary pressure cylinder 55y is connected to back rooms of the secondary pressure cylinders 51c, 51d, 51e, and 51f in the cylinder group By. Incidentally, front rooms of the respective secondary pressure cylinders 51a, 51b, 51c, 51d, 51e, and 51f are connected to an oil tank 59.

Additionally, "100" is a control means in the pressure mechanism 50, and includes an air pressure source 101 of a compressor and the like, an air pressure control circuit 102 with various control valves, and a control section 103 to conduct sequence control. The air pressure source 101 and the control section 103 are respectively connected to the air pressure control circuit 102. Meanwhile, the back rooms of the first cylinder portions 56x and 56y in the primary pressure cylinders 55s and 55y are connected to the air pressure control circuit 102, and the back rooms and front rooms of the second cylinder portions 57x and 57y are connected to the air pressure control circuit 102. A front room and a back room of the auxiliary cylinder 53 are also connected to the air pressure control circuit 102.

The pressure mechanism 50 structured as above can easily conduct control in respective pressure ranges of a low pressure, a medium pressure and a high pressure. Now presume that float portions of the first cylinder portions 56x and 56y, and piston portions of the second cylinder portions 57x and 67y are respectively in backward positions. The lower pressure board 7d is, therefore, in a lowered position. In the back room of the auxiliary cylinder 53 air A is supplied, so that a pressure power to set off an empty weight (load) and the like of the lower pressure board 7d is provided. Accordingly, it is possible that the secondary pressure cylinders 51a, 51g, 51c . . . bear only a pressure power against the laminated-substrate W, and therefore stable pressure control is achievable.

In this state, if the air pressure control circuit 102 supplies air (compressed air) A to the back rooms of the first cylinder portions 56x and 56y for the low pressure output, stable and accurate control in the low pressure range, such as a low pressure range of 0 to 1.0 MPa, is possible. Meanwhile, if the air pressure control circuit 102 supplies air A to the back rooms of the second cylinder portions 57x and 57y for the high pressure output, by a function of the second cylinder portions 57x and 57y of the pressure intensifying cylinders, stable and accurate control in the high pressure range, such as a high pressure range of 2.5 to 17 MPa, is possible.

By the way, under the structure described above, control in a medium pressure range of 1.0 to 2.5 MPa becomes impossible. Control in the medium pressure range is conducted by drive controlling only the primary pressure cylinder 55x. In this case, with the primary pressure cylinder 55x, only two secondary pressure cylinders 51a and 51b are used Consequently, compared with a case that the both primary pressure cylinders are simultaneously used, a generated pressure power can be 1/3. In the embodiment, stable and accurate control in the middle pressure range of 2.5/3 to 17/3 MPa, i.e. 0.8 to 5.7 MPa is possible. Incidentally, when drive control to the primary pressure cylinders 55x and 55y is released, and transfer to a pressure release mode is to be conducted, the auxiliary cylinder 53 is drive controlled, so that the lower pressure board 7d is moved backward (lowered). As described above, since the lower pressure board 7d can be moved backward by the auxiliary cylinder 53 at the time of pressure release mode, this structure contributes to simplification of a circuit structure in a pressure system.

As a result, according to this pressure mechanism 50, it is possible to easily secure stable and detailed pressure control patterns in wide pressure control ranges of the low pressure, the medium pressure, and the high pressure against the pressure power in the thermocompression-bonding step and the like. Also, high control accuracy in the entire wide pressure control ranges of the low pressure, the medium pressure and the high pressure can be obtained. Specifically, though in the primary pressure cylinders 55x . . . an air pressure (air A) is used, the secondary pressure cylinders 51a . . . are operated with an oil pressure (oil L) so that a stable pressure power against the lower pressure board 7d is provided.

Figure 9:
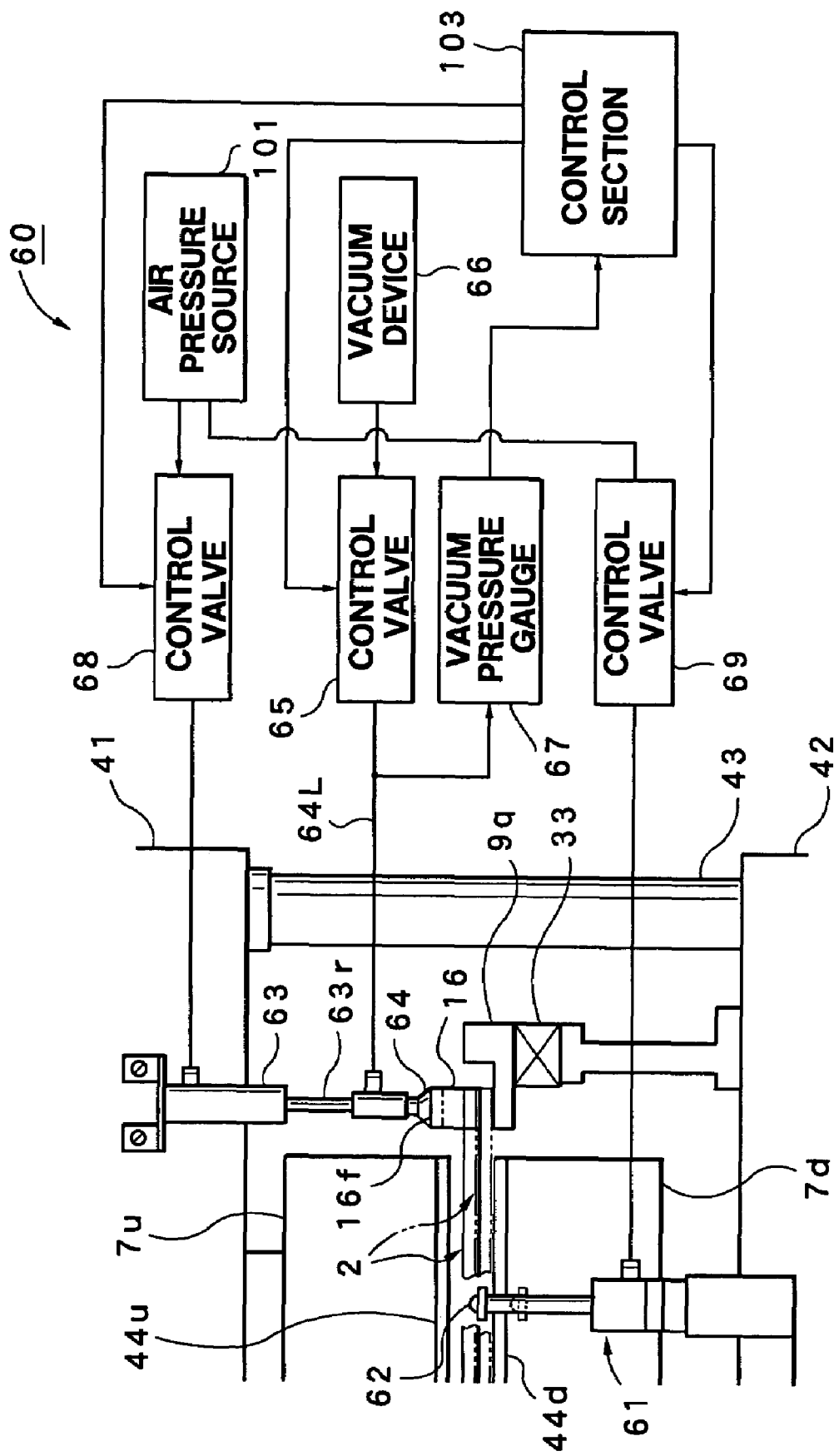
FIG. 9 is a block diagram of a vacuum processing section provided in the heating press unit.
Figure 10:
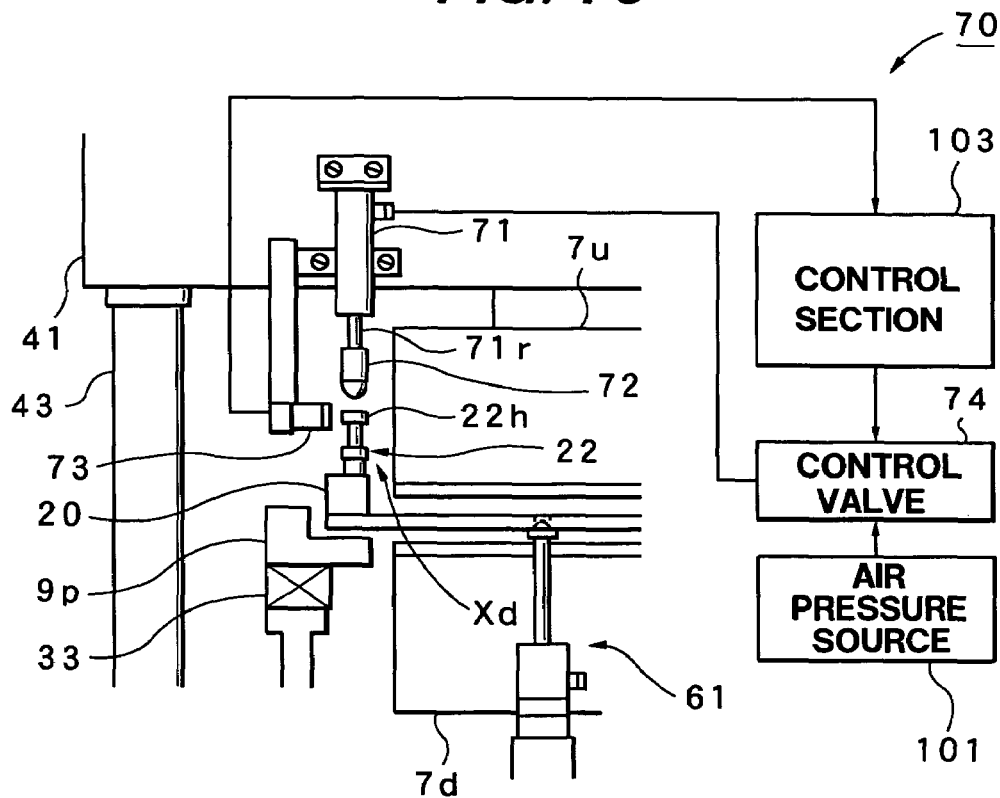
FIG. 10 is a block diagram of an error processing section provided in the heating press unit.
Figure 11:
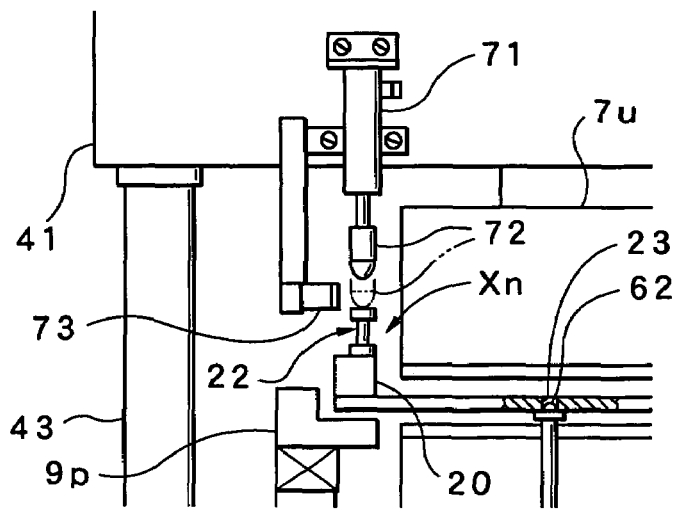
FIG. 11 is a block diagram of a state that an element to be detected is pushed downward by the error processing section.

Meanwhile, on the lower supporting board 42, four lifters 61 . . . of air cylinders are mounted so as to correspond to the four positioning openings 23 . . . on the work tray 2. The lifters 61 . . . have a function to raise the work tray 2 to a predetermined height, as well as a function, as shown in FIG. 9 to FIG. 11, to conduct positioning of the lower pressure board 7u and the work tray 2, with positioning protrusion portions 62 at upper ends thereof which couple to the respective positioning openings 23 . . . on the work tray 2.

Additionally, the heating press unit 7 includes a vacuum processing section 60. The vacuum processing section 60 includes, as shown in FIG. 9, a suction cylinder (air cylinder) 63 fixed on a right side, in a conveying direction, of the upper supporting board 41. An end of a piston rod 63r of the suction cylinder 63 has a sucking disc 64 to suck the surface 16f to be sucked provided on the wok tray 2. This sucking disk 64 is connected via a control valve 68 to a vacuum device 66 of a vacuum pump, while a vacuum line 64L connected to the sucking disc 64 is connected to a vacuum pressure gauge 67. Meanwhile, the suction cylinder 63 is connected via a control valve 68 to the air pressure source 101. "103" is the control section, which controls the control valves 64 and 68, and a detection result detected by the vacuum pressure gauge 67 is inputted to the control section 103. Respective lifters 61 . . . are connected via a control valve 69 to the air pressure source 101. This control valve 69 is also controlled by the control section 103.

Additionally, the heating press unit 7 includes an error processing section 70. The error processing section 70 includes, as shown in FIG. 10, an operation cylinder (air cylinder) 71 fixed on a left side, in a conveying direction, of the upper supporting board 41. An end of a piston rod 71r of the operation cylinder 71 has a pushing element 72 to push downward the head portion 22h of the element 22 to be detected provided on the work tray. In neighborhood of the operation cylinder 71, a detecting portion 73 of a proximity switch and the like which detects the head portion 22h is provided. The operation cylinder 71 is connected via a control valve 74 to the air pressure source 101. "103" is the control section, which controls the control valve 74, and a detection result detected by the detecting portion 73 is inputted to the control section 103. Accordingly, as shown in FIG. 10, when the element 22 to be detected on the work tray 2 is at the detection position Xd, with being pulled upward against the connecting body portion 20, the head portion 22h is near to the detecting portion 73 and detected by the detecting portion 73. Meanwhile, as shown in FIG. 11, when the operation cylinder 71 lowers the pushing element 72 to a position shown by a virtual line, pushing the element 22 to be detected downward to the connecting body portion 20, the element 22 to be detected is displaced to the non detection position Xn shown in FIG. 11. Therefore, the head portion 22h is apart from the detecting portion 73, not being detected by the detecting portion 73.

Figure 12:
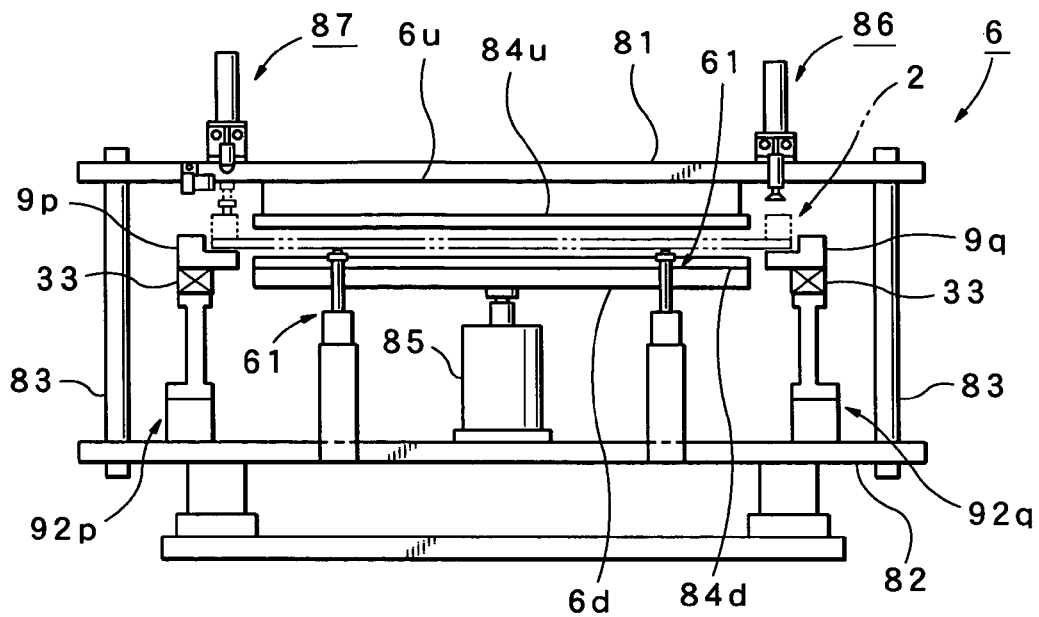
FIG. 12 is a rear view of the vacuum press unit of the laminating apparatus.
Figure 13:
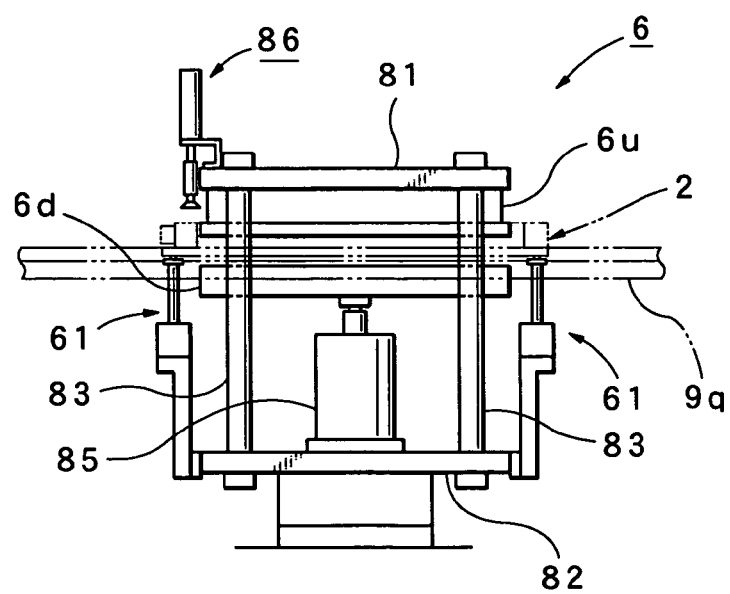
FIG. 13 is a side view of the vacuum press unit.

Meanwhile, FIG. 12 and FIG. 13 show a structure of the vacuum press unit 6. This vacuum press unit 6 includes an upper supporting board 81 and a lower supporting board 82, which are positioned apart from each other vertically and coupled by a coupling shaft 83. On the undersurface of the upper supporting board 81, an upper pressure board 6*u* is fixed. An undersurface of the upper pressure board 6*u* is a flat surface, on which a filler sheet 84*u* is bonded. Beneath and facing this upper pressure board 6*u*, a lower pressure board 6*d* is provided, and this lower pressure board 6*d* is supported raisable and lowerable by a pressure cylinder 85 fixed on a top surface of the lower supporting board 82. This lower pressure board 6*d*, as the upper pressure board 6*u*, has a flat top surface, on which a filler sheet 84*d* is bonded. Additionally, as the heating press unit 7 described above, the vacuum press unit 6 includes four lifters 61., a vacuum processing section 86 and an error processing section 87.

Incidentally, a structure of the cooling press unit 8 is basically the same as that of the heating press unit 7, but differs in that instead of the upper pressure board (upper heat board) 7*u* and the lower pressure board (lower heat board) 7*d* which contain heaters in the heating press unit 7, the cooling press unit 8 includes an upper pressure board 8*u* and a lower pressure board 8*d* which contain cooling means (water jacket and the like for water cooling).

These vacuum press unit 6, heating press unit 7, and cooling press unit 8 are respectively structured as individual units. Therefore, when the respective press units 6 to 8 are mounted on a base 91 as shown in FIG. 1, respective press units 6 to 8 are sequentially mounted on predetermined positions on the base 91, thereafter the conveyer carriers 9*p* and 9*q* are mounted. In this case, on the lower supporting boards 42, 82 . . . of the respective press units 6 to 8, rail supporting portions 92*p* . . . and 92*q* . . . are mounted, and on upper ends of these rail supporting portions 92*p* . . . and 92*q* . . . , the respective conveyer carriers 9*p* and 9*q* are supported via driving portions 33. Consequently, the respective conveyer carriers 9*p* and 9*q* respectively use one rail member which lies across the respective press units 6 to 8. A height of the respective conveyer carriers 9*p* and 9*q* is set to support the work trays 2 . . . which are positioned above the lower pressure boards 6*d*, 7*d*, and 8*d* when the lower pressure boards 6*d*, 7*d*, and 8*d* are lowered, as well as to be lower than the work trays 2 which are supported by the lower pressure boards 6*d*, 7*d*, and 8*d* when the lower pressure boards 6*d*, 7*d*, and 8*d* are raised. Incidentally, "95" indicates a safety wall disposed around the conveyer route R.

As described above, since the vacuum press unit 6, the heating press unit 7, and the cooling press unit 8 are structured as individual units respectively, and besides, the vacuum press unit 6 (vacuum suction step S1), the heating press unit 7 (thermocompression-bonding step S2), and the cooling press unit 8 (cooling step S3) are sequentially disposed on one side of the conveyer route R formed as the rectangular frame, an alteration of respective processing steps S1 to S3 as well as an addition of other processing steps (preheating step, second thermocompression-bonding and the like) can be easily responded by a design alteration as minor as an alteration in a length of the conveyer route R, so that an optional number of addition becomes possible. Therefore, this structure is superior in expansibility. Also, this structure enables freedom of design in that for example a size of a laminated-substrate, specifically a size in a conveying direction, can be optionally set, and can contribute to an improvement in-mass production. Additionally, monitoring of the entire steps can be conducted easily and efficiently in that for example the entire processing steps (S1 to S3) can be monitored at a fixed position, and a moving distance (work flow) of an operator for monitoring, maintenance or the like can be shorten.

Next, an operation of the laminating apparatus according to the present embodiment will be described with reference to FIG. 1 to FIG. 15.

As an overall schematic operation, the work tray 2 is circulatorily conveyed along the conveying route R, while the laminated-substrate W is loaded (accommodated) in the work tray 2 at the loading section 3 and laminate processed through the vacuum press unit 6 (vacuum suction step S1), the heating press unit 7 (thermocompression-bonding step S2), and the cooling press unit 8 (cooling step S3). In FIG. 1, arrows F1, F2, F3, and F4 indicate conveying directions of the work tray 2.

First, an ordinary operation will be described with reference to FIG. 14. Now presume that the work tray 2 is returned through the returning conveyer section Rr to the loading section 3. The attaching/detaching arm 36 of the cover attaching/detaching section 5 is pivoted and displaced by the pivotally driving portion 37 to the suction position shown by the solid line in FIG. 1, and then the suction portion at the front end thereof sucks the top surface of cover portion 2*c* of the work tray 2. Thereafter, the attaching/detaching arm 36 pivots and displaces at the predetermined degree in the opposite direction, and with keeping sucking the cover portion 2*c*, stands by at the standby position shown by the virtual line in FIG. 1. According thereto, the cover portion 2*c* is separated from the tray portion 2*t*. Incidentally, during the time that the work tray 2 is returning from the discharging section 38 to the loading section 3, the release operation portion provided on the work tray 2 is operated to release a function of the check valve. Consequently, the enclosed space K is released from vacuum state and is back to be in atmospheric pressure. When the work tray 2 is returned as a defective tray with the element 22 to be detected of the work tray 2 being displaced to the non detection position, the work tray 2 is replaced and checked for a defect.

Meanwhile, when the cover portion 2*c* is separated from the tray portion 2*t*, the laminated-substrate W which is laminate-processed is taken out and a prepared laminated-substrate W which is not laminate-processed is set on the top surface of the tray portion 2*t*. A setting direction is indicated by an arrow Dw in FIG. 1. In this case, setting can be done automatically or manually. In a case of manual setting, by pressing a start button (not shown), the attaching/detaching arm 36 is pivoted and displaced to the suction position and load the cover portion 2*c* on the tray portion 2*t*, and after loading, the attaching/detaching arm 36 is returned to the standby position. Consequently, the laminated-substrate W is accommodated between the tray portion 2*t* and the cover portion 2*c*. As described above, by accommodating the laminated-substrate W in the work tray 2, temperature and pressure is secured during the time of transfer between press units 6 to 8.

Next, the conveyer mechanism 34 in the introducing conveyer section Ri is raised, and by rotational operation of the conveyer roller mechanism 34*r* . . . , the work tray 2 is conveyed to the standby section 4. At this time the work tray 2 passes over the guide rail 31*p* and the conveyer carrier 9*q*. FIG. 14(*a*) shows a state that all the processings in the vacuum press unit 6, heating press unit 7, and the cooling press unit 8 are finished and the lower pressure boards 6*d*, 7*d*, and 8*d* are lowered. In this case, the conveyer carriers 9*p* and 9*q* are in the backward position and the work tray 2 conveyed through the introducing conveyer section Ri is loaded on the conveyer carries 9*p* and 9*q* in the standby section 4. The respective work trays 2 . . . having finished the processings in the vacuum press unit 6, the heating press unit 7, and the cooling press unit 8 are loaded on the conveyer carriers 9p and 9q since the lower pressure boards 6d, 7d, and 8d are lowered.

Figures 14A, 14B, 14C, 14D, 14E, 14F:
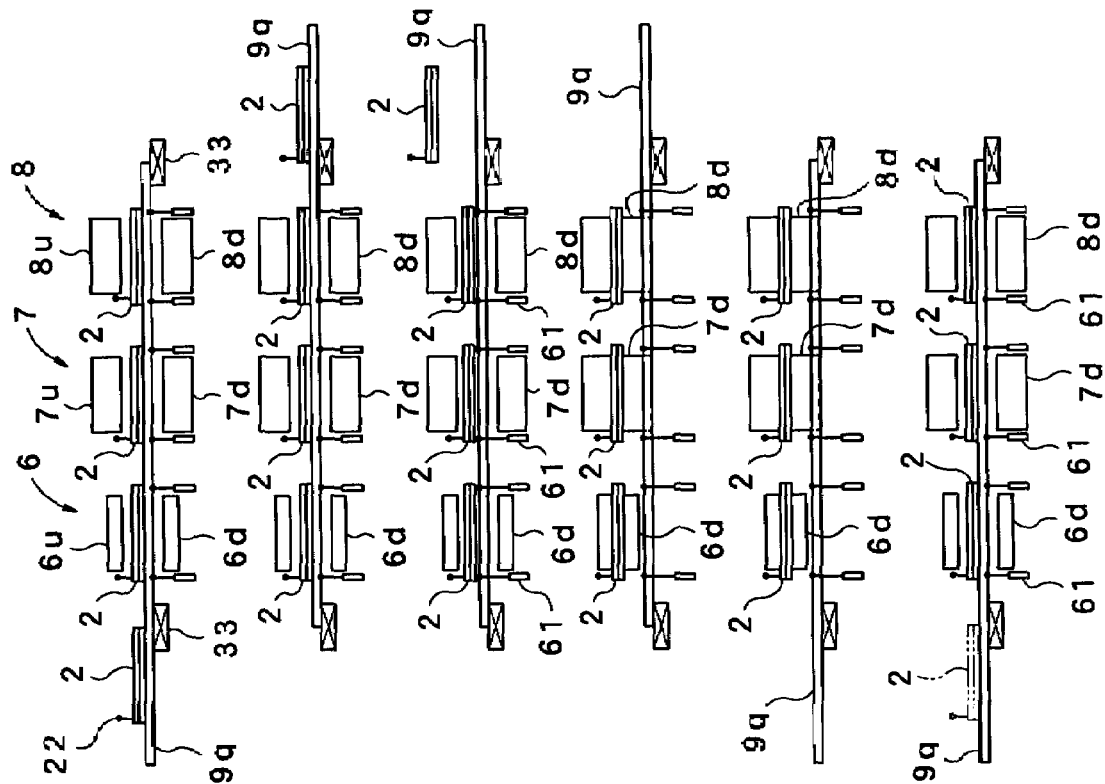
FIG. 14 is an operation explanatory view of the laminating apparatus at a time of normal operation.

As a result, when the driving portions 33 . . . are drive controlled so that the conveyer carriers 9p and 9q are moved by one tact to the position shown by the virtual line (forward position) in FIG. 1, the work tray 2 in the standby section 4 is set in the vacuum press unit 6, the work tray 2 in the vacuum press unit 6 is set in the heating press unit 7, the work tray 2 in the heating press unit 7 is set in the cooling press unit 8, and the work tray 2 in the cooling press unit 8 is set in the discharging section 38. This state is shown in FIG. 14(b). As described above, the conveyer operation of the conveyer carriers 9p and 9q is only a simple back-and-forth motion in a horizontal direction, and a traveling stroke thereof (one tact) is predetermined accurately.

When the respective work trays 2 . . . are set in the respective units 6 to 8 of the next steps, first of all a judgment processing of a vacuum pressure is conducted. In this case in the heating press unit 7 shown in FIG. 6 and FIG. 7, the lifters 61 . . . once raise the work tray 2 to a predetermined height. Also in the vacuum press unit 6 and the cooling press unit 8, the lifters 61 . . . once raise the respective work trays 2 . . . to the predetermined height. This state is shown in FIG. 14(c). At this time, the detecting portion 73 detects the element 22 to be detected on the work tray 2. If the element 22 to be detected is at the detection position Xd, being verified that vacuum suction in the previous step is normally conducted, the judgment processing of the vacuum pressure is conducted, and if the element 22 to be detected is at the non detection position Xn, since being judged to be a defective tray in the previous step, the judgment processing of the vacuum pressure is not conducted.

For the judgment processing, the suction cylinder 63 lowers the sucking disc 64, which sucks the surface 16f to be sucked on the work tray 2. Since the sucking disc 64 is connected to the vacuum device 66, the enclosed space K in the work tray 2 is vacuum sucked by the vacuum device 66. At the time of vacuum suction, whether or not there is abnormality such as leakage in the work tray 2 is judged (inspected). In this case, the vacuum pressure gauge 67 connected to the vacuum line 64L detects the vacuum pressure, and it is judged whether a normal value is reached or not. For example, when a normal value of the vacuum pressure of the heating press unit 7 is set at −96 kPa, a tray with vacuum pressure under −96 kPa is judged to be a defective tray. If the tray is judged defective, the operation cylinder 71 shown in FIG. 10 lowers the pushing element 72 and pushes downward the element 22 to be detected on the work tray 2, which is then displaced to the non detection position Xn shown in FIG. 11. Consequently, in the following cooling step the detecting portion (73) does not detect the element 22 to be detected, so that none of the cooling processing including the judgment processing of the vacuum pressure is conducted.

In the above, the judgment processing of the vacuum pressure in the heating press unit 7 is described, while the processings in the vacuum press unit 6 and the cooling press unit 8 are conducted similarly. In this case, a normal value (for example, −75 kPa) of a vacuum pressure in the cooling press unit 8 is set to be lower than that in the heating press unit 7. Additionally, a common vacuum device is connected to the vacuum press unit 6 and to the cooling press unit 8. Therefore, the normal value of the vacuum pressure in the vacuum press unit 6 is the same as the normal value of the vacuum pressure in the cooling press unit 8. In the vacuum press unit 6, the vacuum suction processing for the enclosed space K is conducted from the state in atmospheric pressure, and therefore, when the value −75 kPa is not reached after a predetermined time since vacuum suction is started, the tray is judged defective.

When the judgment processings of the vacuum pressures are finished, the lower pressure boards 6d, 7d, and 8d are raised. Accordingly, the respective work trays 2 . . . are held between the upper pressure boards 6u, 7u, and 8u, and the lower pressure boards 6d, 7d, and 8d, and are pressure processed. This state is shown in FIG. 14(d). Here, when the vacuum pressure in the work tray 2 does not reach the normal value, i.e., if the tray is judged defective, the corresponding lower pressure boards 6d . . . are not raised. Then, in the vacuum press unit 6 the vacuum processing is conducted and the enclosed space K in the work tray 2 is vacuum sucked so that bubbles contained in the laminated-substrate W are completely eliminated. In the heating press unit 7 the thermocompression-bonding processing is conducted, while in the cooling press unit 8 the cooling processing is conducted.

Meanwhile, the work tray 2 in the discharging section 38 is conveyed, by the raised conveyer mechanism 35 in the discharging conveyer section Ro and the rotational operation of the conveyer roller mechanisms 35r, to the returning conveyer section Rr. At this time, the work tray 2 passes over the conveyer carrier 9q and the guide rail 31p. In this state, together with the lower pressure boards 6d, 7d, and 8d the work trays 2 . . . are raised and are separate from the conveyer carriers 9p and 9q, while the defective tray is supported by the lifters 61 . . . and is separate from the conveyer carriers 9p and 9q. Then, as shown in FIG. 14(e), the driving portions 33 . . . are drive controlled to move the conveyer carriers 9p and 9q to the backward position shown in the solid line in FIG. 1.

After all the processings in the vacuum press unit 6, the heating press unit 7, and the cooling processing unit 8 are finished, the lower pressure boards 6d, 7d, and 8ds are lowered and the lifters 61 . . . for the defective try are lowered. This state is shown in FIG. 14(f). Also, in this state, in the standby section 4 the next work tray 2 is conveyed from the introducing conveyer section Ri onto the conveyer carriers 9q and 9r, being in the same state shown in FIG. 14(a). Therefore, the same operation is repeated hereinafter.

Next, a compensation operation will be described with reference to FIG. 15. This compensation operation is to relieve a lack of work tray 2 when a failure in loading the work tray 2 is caused by some reason.

Figures 15A, 15B, 15C, 15D, 15E:
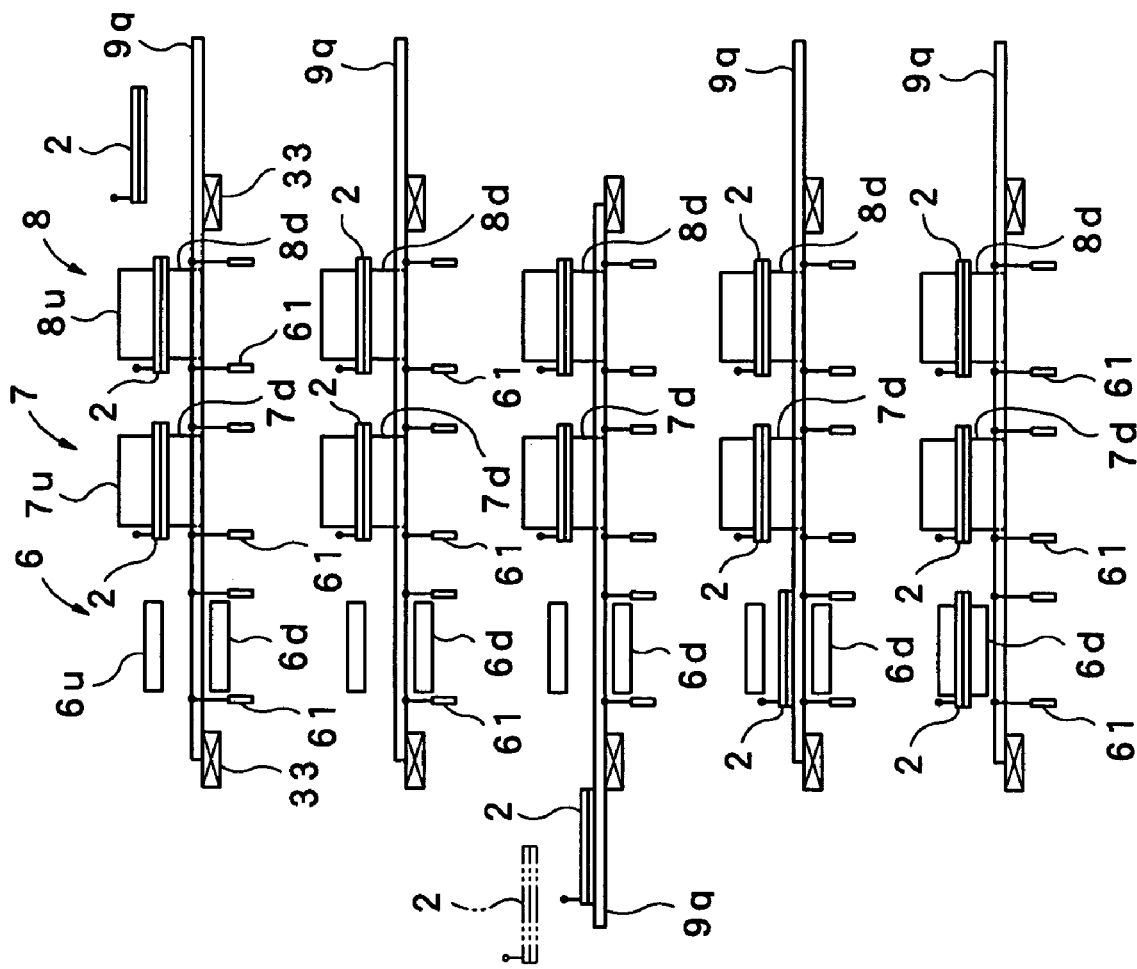
FIG. 15 is an operation explanatory view of the laminating apparatus at a time of compensation operation.

FIG. 15(a) shows the same step as FIG. 14(d). However, in FIG. 15(a), the failure in loading occurs and the work tray 2 is not set in the vacuum press unit 6. When the work tray 2 is not set, the detecting portion 73 does not detect the element 22 to be detected and the lower pressure board 6d is not raised.

In this state, to conduct the compensation operation, a compensation operation button (not shown) is pressed. Then, as shown in FIG. 15(b), the respective lifters 61 . . . are lowered while the driving portions 33 . . . are drive controlled to move the conveyer carriers 9p and 9q to the backward position shown by the solid line in FIG. 1. This state is shown in FIG. 15(c). According thereto, the next work tray 2 is conveyed from the loading section 3 to the standby section 4 and loaded on the conveyer carriers 9p and 9q. When the next work tray 2 is loaded on the conveyer carriers 9p and 9q in the standby section 4, the driving portions 33 ... are drive controlled to move the conveyer carriers 9p and 9q to the forward position shown by the virtual line in FIG. 1. This state is shown in FIG. 15(d).

Next, the respective lifters 61 ... are raised to the predetermined height. According thereto, the judgment processing of the vacuum pressure in the vacuum press unit 6 is conducted, and if normal the lower pressure board 6d is raised to conduct the vacuum suction processing. This state is shown in FIG. 15(e). FIG. 15(e) is the same as FIG. 14(d), and therefore the normal operation can be started again.

As described above, the laminating apparatus M according to the present embodiment is constituted with the vacuum press unit 6, the heating press unit 7, and the cooling press unit 8 which respectively include the upper pressure boards 6u, 7u, and 8u fixed on the upper side and the lower pressure boards 6d, 7d, and 8d provided raisable and lowerable on the lower side. Additionally, since in the processing conveyer section Rp thereof conveyer carriers 9p and 9q capable of selectively moving to the forward position or the backward position in a conveying direction are provided, carrier operation of the conveyer carriers 9p and 9q is only a simple back-and-forth movement in a horizontal direction, simplifying a structure of the processing conveyer section Rp. Moreover, if by some reason a failure in loading the work tray 2 occurs, a compensation operation can easily relieve a lack of the work tray 2.

Hereinabove, the present embodiment has been explained in detail. However, the present invention is not limited to this embodiment, but it should be considered to be acceptable to modify any detail of structure, form, material, quantity, numeric value and so on without departing from the spirit of the present invention, and at the same time to add or cancel some details as necessary.

For example, though the route and the like of the processing conveyer section Rp are shown to be linearly structured, they can be circularly structured and so on, with the form not necessarily being a strait line. Also, other steps such as a preheating step and a second thermocompression-bonding step can be provided. Incidentally, a laminated-substrate W is preferably used for an IC card, but can be applied to other optional card and the like.

What is claimed is:

1. A laminating apparatus comprising:
   a vacuum suction step for vacuum sucking an enclosed space inside a work tray housing a laminated-substrate;
   a thermocompression-bonding step for heating and pressuring the work tray having finished said vacuum suction step; and
   a cooling step for cooling the work tray having finished said thermocompression-bonding step,
   wherein a conveyer route of a rectangular frame form to circulatorily convey the work tray along a horizontal direction is provided, and
   wherein, in a processing conveyer section composing one side of the conveyer route, said vacuum suction step, said thermocompression-bonding step, and said cooling step are sequentially disposed,
   wherein the work tray includes a tray portion and a cover portion overlapping the tray portion, accommodates a laminated-substrate to be laminate processed between the tray portion and the cover portion, and has a structure that at least the inside enclosed space in which the laminated-substrate is accommodated is vacuum sucked, and
   wherein the tray portion is provided with a surface to be sucked on which a sucking disc connected to a vacuum device abuts and a vacuum connection inlet is formed, and
   wherein the vacuum connection inlet is connected through a ventilation path having a check valve to a suction opening formed on the tray portion facing the enclosed space.

2. The laminating apparatus according to claim 1, further comprising: a connecting body portion which has the surface to be sucked on an exterior surface and has, inside, the ventilation path which is connected to the vacuum connection inlet and to which the check valve is attached; and
   a connecting path portion which has a ventilation path to connect the ventilation path of the connecting body portion and the suction opening.

3. The laminating apparatus according to claim 1, wherein the tray portion includes at least one vacuum tank which communicates with the enclosed space.

4. The laminating apparatus according to claim 1,
   wherein the tray portion includes a rectangular supporting frame portion and a rectangular tray main body provided inside the supporting frame portion, and
   wherein, on four sides of the tray main body, a plurality of engaging pieces are respectively formed protrudingly, and by engaging these engaging pieces to the, supporting frame portion the supporting frame portion supports the tray main body.

5. The laminating apparatus according to claim 1,
   wherein the conveyer route includes a returning conveyer section disposed parallel to the processing conveyer section, an introducing conveyer section disposed between one ends of the processing conveyer section and the returning conveyer section, and a discharging conveyer section disposed between the other ends of the processing conveyer section and the discharging conveyer section,
   wherein, in a corner of the conveyer route from which the introducing conveyer section starts, a loading section to load the laminated substrate on the work tray is provided, and
   wherein, in a next corner of the conveyer route from which the 30 processing conveyer section starts, a standby section for the work tray is provided.

6. The laminating apparatus according to claim 5, wherein the loading section includes a cover attaching/detaching section to attach or detach the upper cover portion to/from the lower tray portion.

7. The laminating apparatus according to claim 1, wherein said vacuum suction step, said thermocompression-bonding step, and said cooling step respectively include a vacuum press unit, heating press unit, and a cooling press unit.

8. The laminating apparatus according to claim 7, wherein the vacuum press unit, the heating press unit, and the cooling press unit respectively include upper pressure boards fixed on the upper sides and lower pressure boards provided raisable and lowerable on the lower sides.

9. The laminating apparatus according to claim 8, further comprising:
   a plurality of cylinder groups which include one or two and above secondary pressure cylinder(s) to pressure the pair of pressure boards;
   a plurality of primary pressure cylinders which are provided corresponding to said respective cylinder groups, and which are connected to the corresponding secondary pressure cylinders and drive the secondary pressure cylinders; and a drive control means for selecting one or two and above of said primary pressure cylinders and drive controlling said primary pressure cylinder(s).

10. The laminating apparatus according to claim 9 wherein said primary pressure cylinders are structured to be switchable between a low pressure output and a high-pressure output.

11. The laminating apparatus according to claim 10, wherein said primary pressure cylinders include a first cylinder portion for the low pressure output which has a back room capable of supplying a first fluid and a front room capable of accommodating a second fluid, and a second cylinder portion for the high pressure output which has a back room capable of supplying the first fluid and a piston rod room capable of accommodating the second fluid, wherein the front room of the first cylinder portion and the piston rod room of the second cylinder portion are confluent and connected to the corresponding secondary pressure cylinder, and wherein at least the second cylinder portion is structured of a pressure intensifying cylinder which intensifies and outputs an inputted pressure, and a pressure intensifying ratio is set to be larger than the pressure intensifying ratio of the first cylinder portion.

12. The laminating apparatus according to claim 8, further comprising an auxiliary cylinder to pull the pressure board to an opposite direction against a pressuring direction.

13. The laminating apparatus according to claim 8, wherein the processing conveyer section includes a conveyer carrier capable of selectively moving to a forward position or a backward position, wherein a height of the conveyer carrier is set to support the work tray positioned above the lower pressure board when the lower pressure board is lowered, and to be positioned beneath the work tray supported by the lower pressure board when the lower pressure board is raised.

14. The laminating apparatus according to claim 13, further comprising a right and left pair of conveyer carriers to support right and left ends of the work tray.

15. The laminating apparatus according to claim 13, wherein the vacuum 30 press unit, the heating press unit, and the cooling press unit include a lifter to raise the work tray to a predetermined height by supporting front and back ends of the work tray.

16. The laminating apparatus according to claim 13, wherein the processing conveyer section include a function to sequentially convey the work tray by moving the conveyer carrier to the backward position when the lower pressure board is raised, and moving the conveyer carrier to the forward position when the lower pressure board is lowered.

17. The laminating apparatus according to claim 16, wherein a defective/non-defective judgment on the work tray is conducted before the lower pressure board is raised, and in a case of a defective tray, without the lower pressure board in the corresponding press unit being raised, the lifter raises the defective tray to a predetermined height.

18. The laminating apparatus according to claim 7, wherein, one or two and above of said steps include(s)

a vacuum pressure surveillance means for detecting a vacuum pressure of the enclosed space in the conveyed work tray and judging whether the vacuum pressure is normal or not, and an error processing means for conducting an error processing as the defective tray when the vacuum pressure is not normal.

19. The laminating apparatus according to claim 18, wherein the error processing means switches a portion to be detected provided on the work tray to an error side.

20. The laminating apparatus according to claim 18, wherein the error processing means uses, for the portion to be detected, an element to be detected which selectively displaces to a detection position to indicate that the vacuum pressure is normal or a non detection position to indicate that the vacuum pressure is not normal, and wherein said step includes an operation portion to displace the element to be detected to the non detection position.

21. The laminating apparatus according to claim 18, wherein the error processing means provides, to said step, a detecting portion to detect the portion to be detected which is switched to the error side, and stops processings of said respective steps to the defective tray of which the portion to be detected is switched to the error side.

* * * * *